United States Patent
Crawford et al.

(10) Patent No.: US 10,228,873 B2
(45) Date of Patent: Mar. 12, 2019

(54) SWAPPING TAPE CARTRIDGES IN TAPE LIBRARIES

(71) Applicant: International Business Machines Corporation, Armonk, NY (US)

(72) Inventors: Joshua J. Crawford, Tucson, AZ (US); Paul A. Jennas, II, Tucson, AZ (US); Jason L. Peipelman, Austin, TX (US); Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 15/635,947

(22) Filed: Jun. 28, 2017

(65) Prior Publication Data
US 2019/0004714 A1   Jan. 3, 2019

(51) Int. Cl.
*G06F 3/06* (2006.01)
*G11B 15/675* (2006.01)

(52) U.S. Cl.
CPC .......... *G06F 3/0619* (2013.01); *G06F 3/065* (2013.01); *G06F 3/0647* (2013.01); *G06F 3/0686* (2013.01); *G11B 15/675* (2013.01)

(58) Field of Classification Search
CPC ...... G06F 3/0619; G06F 3/0647; G06F 3/065; G06F 3/0686; G06F 3/0617; G06F 3/0614; G06F 3/0607; G06F 3/0649; G06F 3/0682; G11B 15/675
See application file for complete search history.

(56) References Cited

U.S. PATENT DOCUMENTS

| | | | |
|---|---|---|---|
| 5,604,862 A * | 2/1997 | Midgely | G06F 11/1448 710/39 |
| 6,675,177 B1 * | 1/2004 | Webb | G06F 11/1458 |
| 8,601,209 B1 | 12/2013 | LeCrone et al. | |
| 8,868,866 B2 | 10/2014 | Hoelsaeter | |
| 9,087,014 B1 | 7/2015 | Jennas, II et al. | |
| 9,116,853 B1 | 8/2015 | Jennas, II et al. | |
| 9,240,209 B1 | 1/2016 | Crawford et al. | |
| 9,423,973 B2 | 8/2016 | Crawford et al. | |
| 9,600,493 B1 * | 3/2017 | Hasegawa | G06F 17/30221 |
| 9,606,749 B2 | 3/2017 | Crawford et al. | |
| 2006/0080502 A1 * | 4/2006 | Sakaki | G06F 3/0607 711/112 |
| 2006/0236056 A1 * | 10/2006 | Nagata | G06F 3/061 711/165 |
| 2007/0233757 A1 * | 10/2007 | Inai | G06F 3/061 |

(Continued)

*Primary Examiner* — Michael Krofcheck
(74) *Attorney, Agent, or Firm* — Nelson and Nelson; Daniel P. Nelson; Alexis V. Nelson (57) ABSTRACT

A method for swapping out tape cartridges in tape libraries is disclosed. In one embodiment, such a method includes maintaining, in a tape library, old tape cartridges backing up data in a primary storage system. The method adds, to the tape library, new tape cartridges to replace the old tape cartridges. The method then initiates a data transfer process to move active data to the new tape cartridges. This data transfer process first moves active data in less frequently accessed storage elements, followed by active data in more frequently accessed storage elements. During the data transfer process, the method backs up updates to data in the primary storage system to the new tape cartridges. A corresponding system and computer program product are also disclosed.

20 Claims, 7 Drawing Sheets

(56) References Cited

U.S. PATENT DOCUMENTS

| | | | | |
|---|---|---|---|---|
| 2008/0019226 | A1* | 1/2008 | Sasage | G06F 3/0605 369/30.44 |
| 2009/0237828 | A1* | 9/2009 | Hatabe | G11B 15/689 360/71 |
| 2010/0017573 | A1* | 1/2010 | Shinozaki | G06F 11/1662 711/162 |
| 2012/0260266 | A1* | 10/2012 | Tomii | G06F 3/0607 719/327 |
| 2012/0265954 | A1* | 10/2012 | Haustein | G06F 3/061 711/160 |
| 2016/0011818 | A1* | 1/2016 | Hashimoto | G11C 16/3495 711/103 |
| 2016/0092370 | A1 | 3/2016 | Crawford et al. | |
| 2016/0139812 | A1* | 5/2016 | Zhang | G06F 3/0608 711/103 |

* cited by examiner

SWAPPING TAPE CARTRIDGES IN TAPE LIBRARIES

BACKGROUND

Field of the Invention

This invention relates to systems and methods for swapping out tape cartridges in tape libraries.

Background of the Invention

As data storage needs continue to increase at a rapid rate, magnetic tape continues to offer some significant advantages over other data storage technologies. At an average cost on the order of $0.01 per gigabyte, tape storage is typically the most affordable option for storing massive quantities of data. Recent technological advances have also increased the speed that data can be written to and/or retrieved from tape, with some tape drives having the ability to read and/or write data at speeds of over 1 terabyte per hour. Other advantages of magnetic tape include reduced energy costs associated with storing data, portability, greater reliability and longevity, and the ability to easily scale tape storage as storage needs increase. For these reasons, tape storage often plays a significant role in an organization's data storage infrastructure.

In certain cases, tape storage may be used to store a redundant copy of data residing on disk storage. In such cases, the tape storage may be configured such that data and metadata are written sequentially to the end of a circular buffer, also called a log. This improves write throughput because writes may be batched into large sequential runs that avoid costly seeks on the tape medium. This creates multiple, chronological versions of both files and metadata. Recovery may also be simpler in log-structured tape systems, as needed data may be recovered from the end of the log.

When tape storage is used for backup or disaster recovery purposes, tape cartridges may eventually fill up with data and need to be changed out with new tape cartridges. Once swapped out, the old tape cartridges may be stored offsite in a vault or other location. Swapping of tape cartridges unfortunately has the potential to interrupt data backup processes or create gaps in data redundancy. Thus, when changing out tape cartridges, systems and methods are needed to ensure that data backup processes are minimally interrupted and data redundancy is maintained.

SUMMARY

The invention has been developed in response to the present state of the art and, in particular, in response to the problems and needs in the art that have not yet been fully solved by currently available systems and methods. Accordingly, systems and methods are disclosed for swapping out tape cartridges in tape libraries. The features and advantages of the invention will become more fully apparent from the following description and appended claims, or may be learned by practice of the invention as set forth hereinafter.

Consistent with the foregoing, a method for swapping out tape cartridges in tape libraries is disclosed. In one embodiment, such a method includes maintaining, in a tape library, old tape cartridges backing up data in a primary storage system. The method adds, to the tape library, new tape cartridges to replace the old tape cartridges. The method then initiates a data transfer process to move active data to the new tape cartridges. This data transfer process first moves active data in less frequently accessed storage elements, followed by active data in more frequently accessed storage elements. During the data transfer process, the method backs up updates to data in the primary storage system to the new tape cartridges.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1:
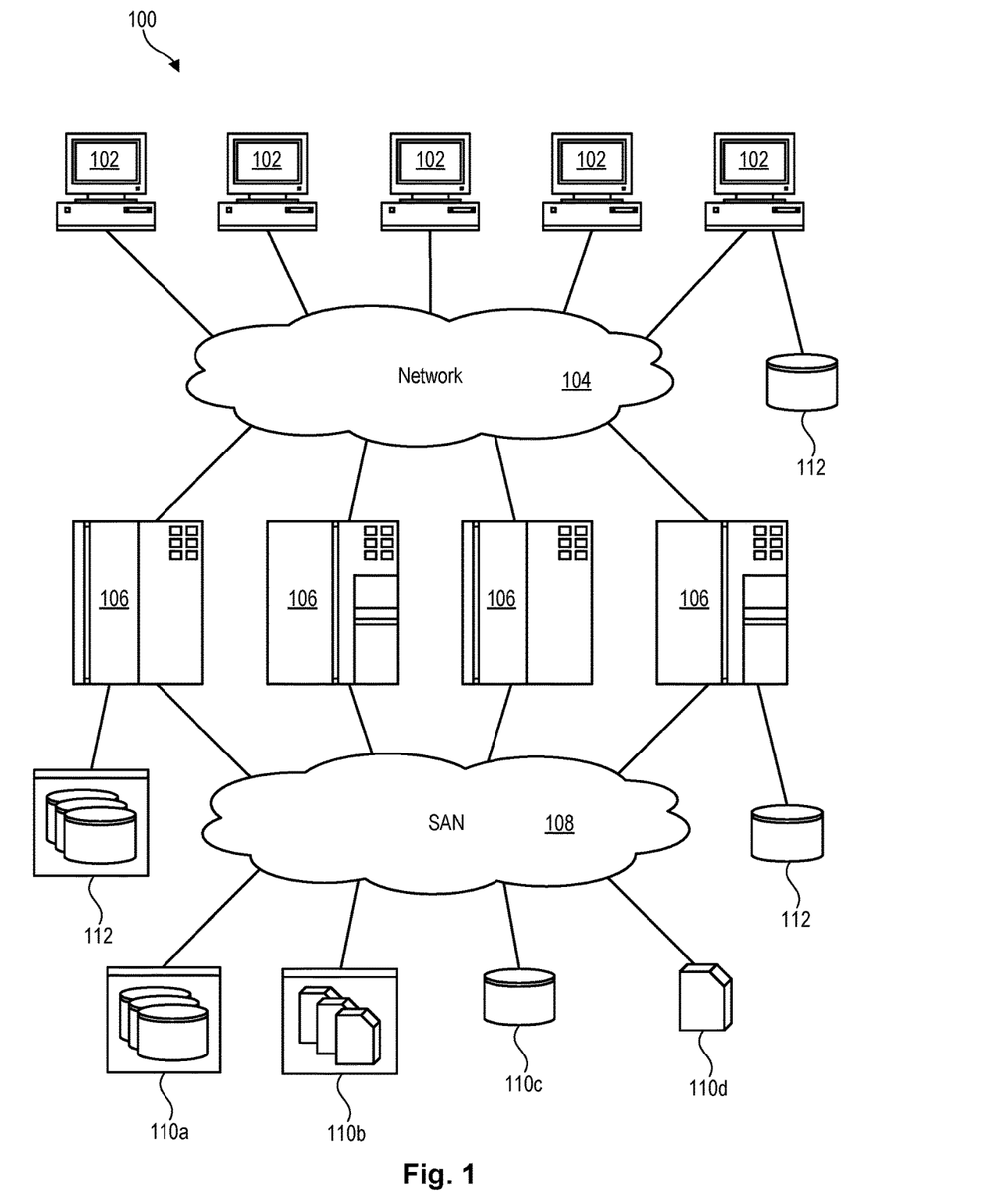
FIG. 1 is a high-level block diagram showing one example of a network environment in which a system and method in accordance with the invention may be implemented.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
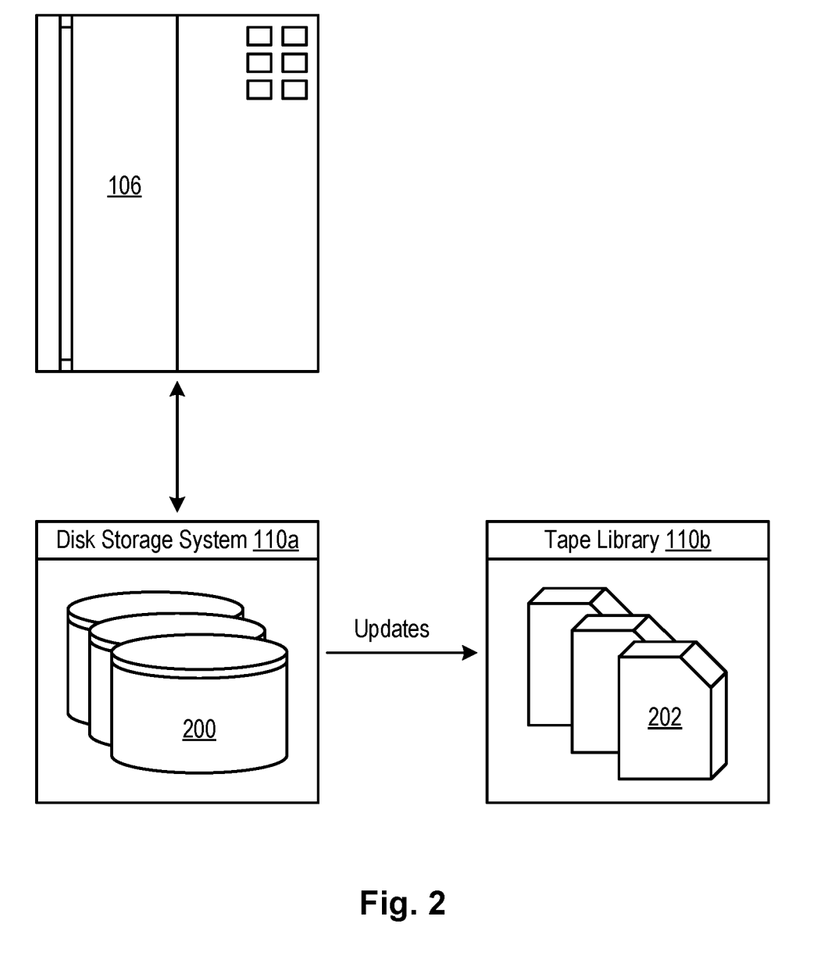
FIG. 2 is a high-level block diagram showing utilization of a tape library to store a redundant copy of data in a disk storage system.

Referring to FIG. 2, as previously mentioned, tape storage may in certain cases be used to store a redundant copy of data on disk storage. For example, as shown in FIG. 2, data written to volumes 200 of a disk storage system 110a may in certain embodiments be synchronously (or asynchronously) mirrored to volumes 202 of a tape library 110b to maintain two consistent copies of the data. The disk storage system 110a and tape library 110b may be located at different sites, perhaps hundreds or thousands of miles away from one another. In the event the disk storage system 110a fails, the redundant data stored in the tape library 110b may be used recover data on the disk storage system 110a or another storage system 110.

In certain cases, the tape storage 110b may be configured such that data and metadata are written sequentially to the end of a circular buffer, also called a log. This improves write throughput because writes may be batched into large sequential runs that avoid costly seeks on the tape medium. This also creates multiple, chronological versions of both files and metadata. Recovery may be simpler in a log-structured tape system 110b, as needed data may be recovered from the end of the log.

Figure 3:
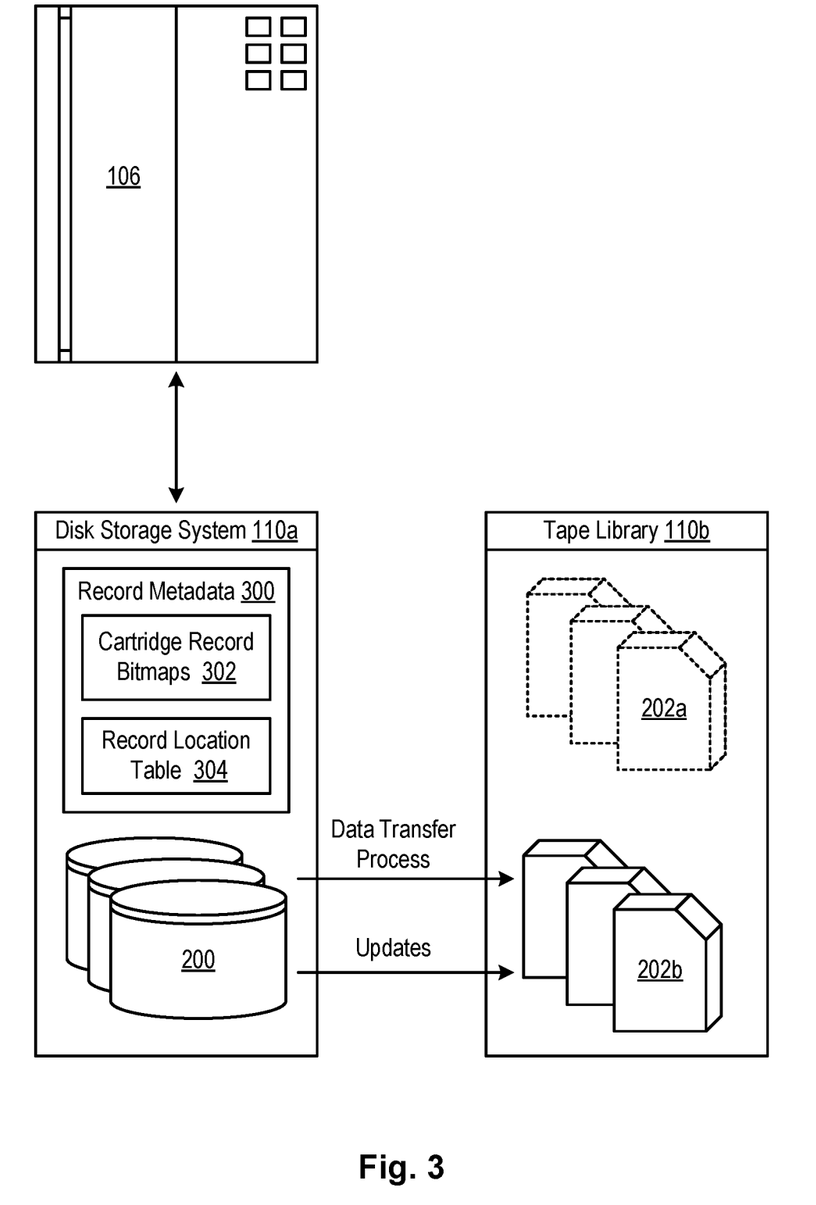
FIG. 3 is a high-level block diagram showing adding of new tape cartridges to the tape library to replace old tape cartridges, and initiating a data transfer process to transfer active data to the new tape cartridges.

The system shown in FIG. 3 may enable mirroring of data from a disk storage system 110a to a tape storage system 110b in a way that reduces tape seek times by sequentially writing the data without needing to index the data at specific locations on the tape cartridges 202. When a write command is received by the disk storage system 110a, the disk storage system 110a may write a record containing the data, a disk location information, and a sequence value to a tape drive loaded with a tape cartridge 202 while synchronously writing the data to disk 200. The disk location information and sequence value may be located in a header to simplify identification when restoring the data from the tape. The disk location information may represent a physical disk location or a logical location. The sequence values for records may indicate the sequence of the records when compared to each other. For example, the sequence value may be a number which increases sequentially for each record written to tape. Thus, a record with a higher sequence number may indicate a more recent record than a record with a lower sequence number.

The tape storage system 110b may maintain metadata 300 in association with the records. The metadata 300 may include, for example, a bitmap 302 for each tape cartridge 202 indicating record locations which contain current data (i.e., contain a current record) and record locations that are free (i.e., contain an old record or no data). The metadata 300 may further include a record location table 304 that documents the locations of current records on tape for each disk location.

After writing a record to tape storage 110b, the disk storage system 110a may mark the location of the record as containing current data in the record metadata 300. Additionally, the disk storage system 110a may reference the metadata 300 to identify the record location for a previous record associated with the same disk location. The disk storage system 110a may mark this record location as free and update the metadata 300 to indicate the record location of the new record for the disk location.

Additionally, after writing a record to tape storage 110b, the tape cartridge 202 may be positioned at the next free record location. The next free record location may be determined by referencing the metadata 300. If the tape cartridge 202 is full, a different tape cartridge 202 may be loaded into the tape drive and positioned at the next free record location. The record metadata 300 may be referenced to identify a tape cartridge 202 with the most free record locations in determining which tape cartridge 202 to load into the tape drive. Writes to the tape cartridges 202 may be structured in such a way that they can be written in parallel to many active tape drives containing separate tape cartridges 202. This parallel writing may be scaled easily to ensure there is no loss of throughput capability from the host's perspective.

Data may be restored from the tape storage 110b using information stored thereon. The tape cartridges 202 may be scanned and disk locations and sequence numbers for each record may be read. This information may be located in a header for each record. A record restore table may be generated and populated with information read from the tape cartridges 202. The record restore table may include a disk location, the record location on tape, and a sequence value. For each record, the record restore table may be populated for the disk location if there is no previous record for the disk location. If the record restore table is already populated for a given disk location, the table may be updated to reference the new record, including the record location and sequence number, if the sequence number for the record indicates a more recent record when compared to the sequence number in the table. If the sequence value indicates an older record, the record may be ignored. This process may continue until all of the records are scanned.

The completed record restore table may indicate the most current record location for each disk location. This information may be used to restore data from the tape cartridges 202 to their respective disk locations. In some embodiments, a user may be presented with a list of disk locations or volumes which are available to be restored. The user may then make a selection from the list and the selection may be restored from the tape cartridges 202 using the record restore table.

When tape is used for backup or disaster recovery purposes, tape cartridges 202 may eventually fill up with data and need to be changed out with new tape cartridges 202. Once swapped out, the old tape cartridges 202 may, in certain cases, be stored offsite in a vault or other secure location. Swapping of tape cartridges 202 unfortunately has the potential to interrupt data backup processes or create gaps in data redundancy. Thus, when changing out tape cartridges 202, systems and methods are needed to ensure that data backup processes are minimally interrupted and data redundancy is maintained.

FIG. 3 shows one embodiment of a technique for changing out old tape cartridges 202a (collectively referred to as an "old tape cartridge pool 202a") with new tape cartridges 202b (collectively referred to as a "new tape cartridge pool 202b") in a tape environment. As shown, old tape cartridges 202a are initially used to back up data in a primary storage system, in this example the disk storage system 110a. When the old tape cartridges 202a are full or substantially full, new tape cartridges 202b may be added to the tape library 110b. A data transfer process may then be initiated to move active data (i.e., records) to the new tape cartridges 202b. When a user initiates the data transfer process, a list of tape cartridges 202 associated with the mirroring or synchronization process may be modified to include only the new tape cartridges 202b. From this point forward, all updates to the disk storage system 110a may be mirrored to the new tape cartridges 202b. To improve efficiency of the data transfer process, active data may be moved from the disk volumes 200 to the new tape cartridges 202 as opposed to from the old tape cartridges 202a to the new tape cartridges 202b. During the data transfer process, the record location table 304 on the disk storage system 110a may keep track of which data or storage elements are active on the old and new tape cartridges 202.

As will be discussed in more detail in association with FIG. 4, the data transfer process may be configured to first move active data in less frequently accessed storage elements (e.g., tracks), followed by active data in more frequently accessed storage elements. During the data transfer process, updates to data in the disk storage system 110a may be mirrored to the new tape cartridges 202b. The updates will assist the data transfer process by storing, in the new tape cartridges 202b, active data for storage elements that are updated. For this reason, the data transfer process will delay or leave to the end the transfer of active data for storage elements that are updated more frequently, since active data for these storage elements will most likely be stored in the new tape cartridges 202b during the normal update or mirroring process.

Figure 4:
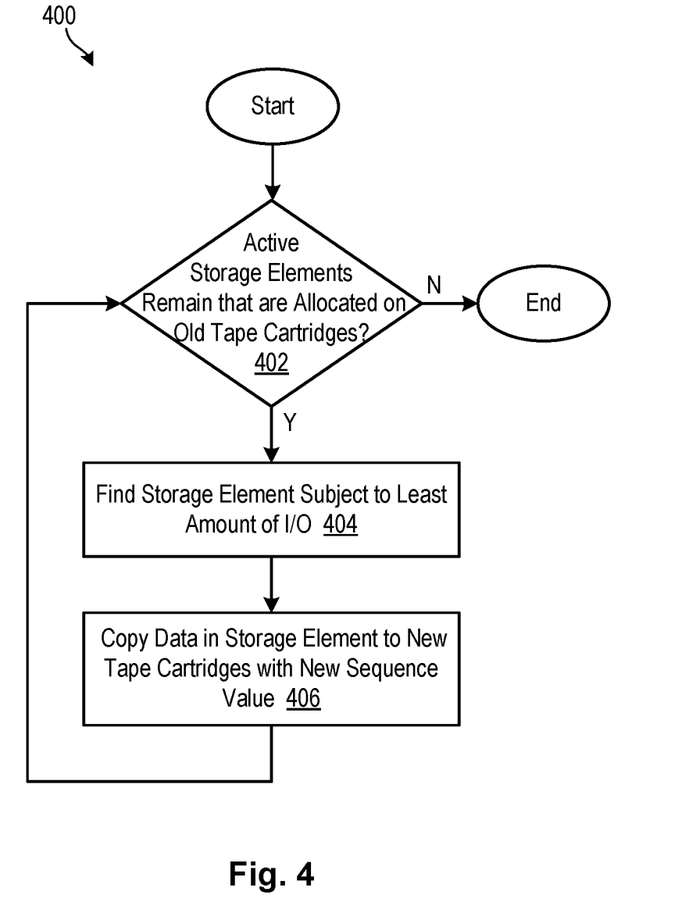
FIG. 4 is a process flow diagram showing one embodiment of a method for executing the data transfer process.

Referring to FIG. 4, one embodiment of a method 400 for executing the data transfer process is illustrated. As shown, the method 400 determines 402 whether any active storage elements (e.g., tracks) remain that are allocated on the old tape cartridges 202a. If so, the method 400 finds 404 the storage element that is subject to the least amount of I/O and copies 406 data from this storage element to the new tape cartridges 202. This data is assigned a new sequence value. This process repeats until all active data is copied to the new tape cartridges 202b. As indicated above, this method 400 more efficiently copies active data to the new tape cartridges 202b since active data in storage elements that are subject to frequent I/O will be copied over to the new tape cartridges 202b during the course of normal back up (i.e., mirroring) operations.

Figure 5:
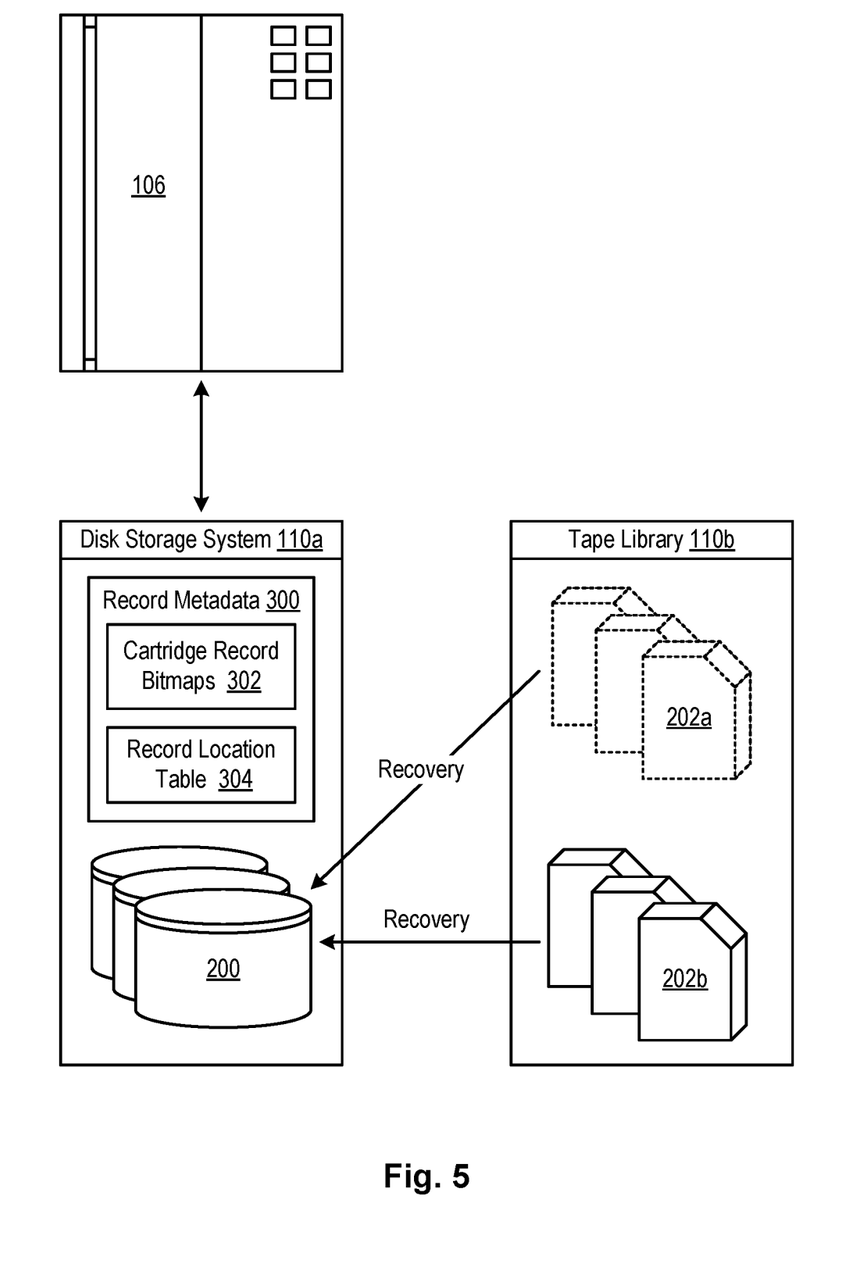
FIG. 5 is a high-level block diagram showing recovery of data to the disk storage system in the event a failure occurs during the data transfer process.

Referring to FIG. 5, in the event a failure occurs on the disk storage system 110a during the data transfer process (i.e., before the data transfer process has completed), data in the disk storage system 110a may be recovered from the tape library 110b. In such a scenario, both the old tape cartridges 202a and new tape cartridges 202b may contain active data that needs to be restored to the disk storage system 110a. Thus, in such a scenario, data may be recovered from both the old tape cartridges 202a and new tape cartridges 202b. The recovery process may use all tape cartridges 202a, 202b from both cartridge pools and use them as a single recovery point without any modification. Once the data transfer process is complete, data may be recovered exclusively from the new tape cartridges 202b.

Figure 6:
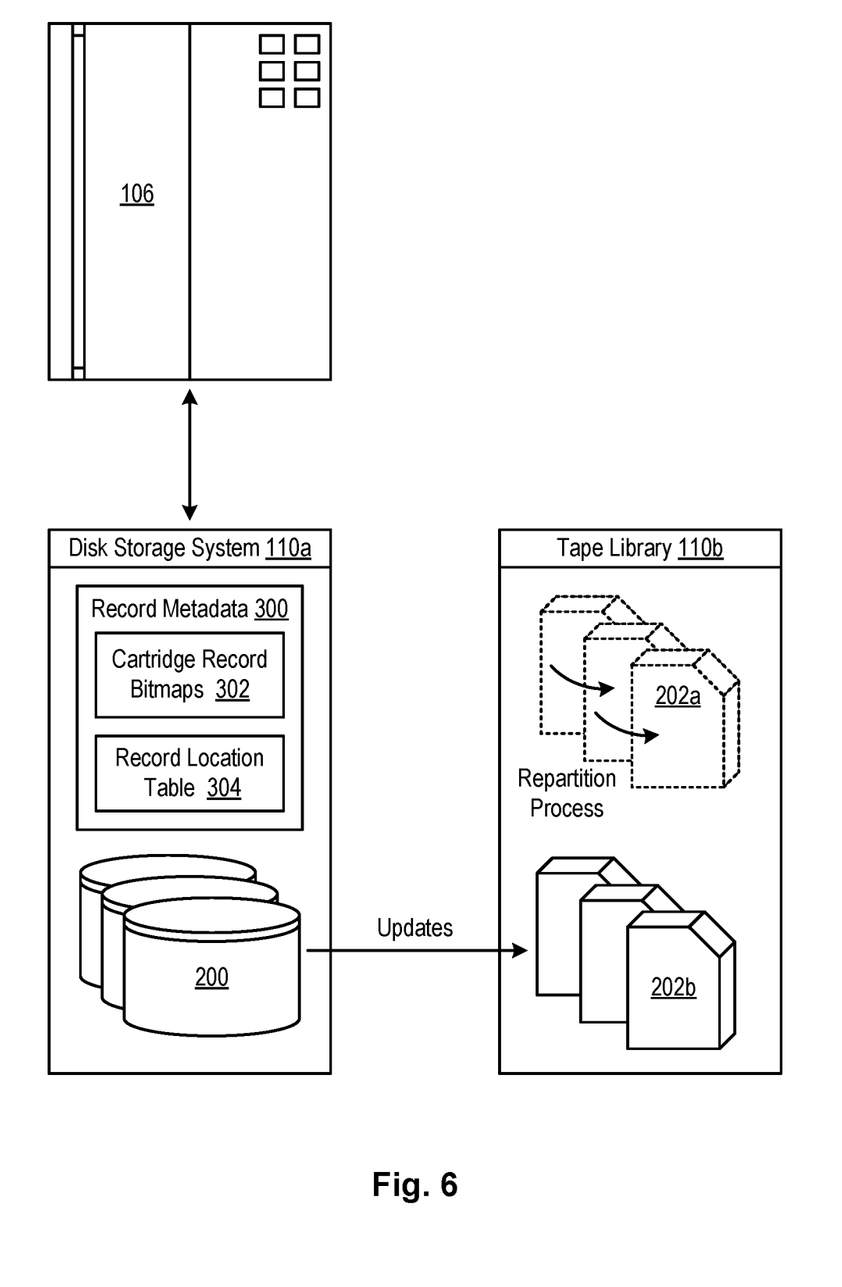
FIG. 6 is a high-level block diagram showing repartitioning of data on the old tape cartridges after completion of the data transfer process.

Referring to FIG. 6, in certain embodiments in accordance with the invention, a cartridge pool may be configured with more storage space than is actually required to store data that is being backed up. This may provide some buffer space in the tape cartridges 202. In certain embodiments, this ratio may be approximately 2:1, although other ratios are also possible. Therefore, a tape cartridge 202 may be considered "full" and ready for removal even when the tape cartridge 202 contains substantial free storage space. In such cases, it may be beneficial to repartition the data in the old tape cartridges 202a to store it on a minimum or smaller number of tape cartridges 202. This will reduce the number of tape cartridges 202 that need to be archived. This may also free up storage space on other old tape cartridges 202a so that they can be reused or repurposed. The repartitioning process may be performed after the data transfer process is complete but prior to removing the old tape cartridges 202a from the tape library 110b.

In order to repartition the data, the record location table 304 may be saved prior to initiating the data transfer process. Once the data transfer process is complete, the repartitioning process may be initiated to move storage elements from the old tape cartridge 202a with the least number of active storage elements to the old tape cartridge 202a with the most active storage elements (but still with free space remaining) in order to minimize data movement and use of the tape drives. This may be accomplished by analyzing the saved record location table 304 which stores sequence values and locations for all active storage elements on the old tape cartridges 202a. When performing the repartitioning process, data may be copied from the disk storage system 110a to the old tape cartridges 202a as opposed to between the old tape cartridges 202a. In other words, no reading from the old tape cartridges 202a is required to complete this process.

Figure 7:
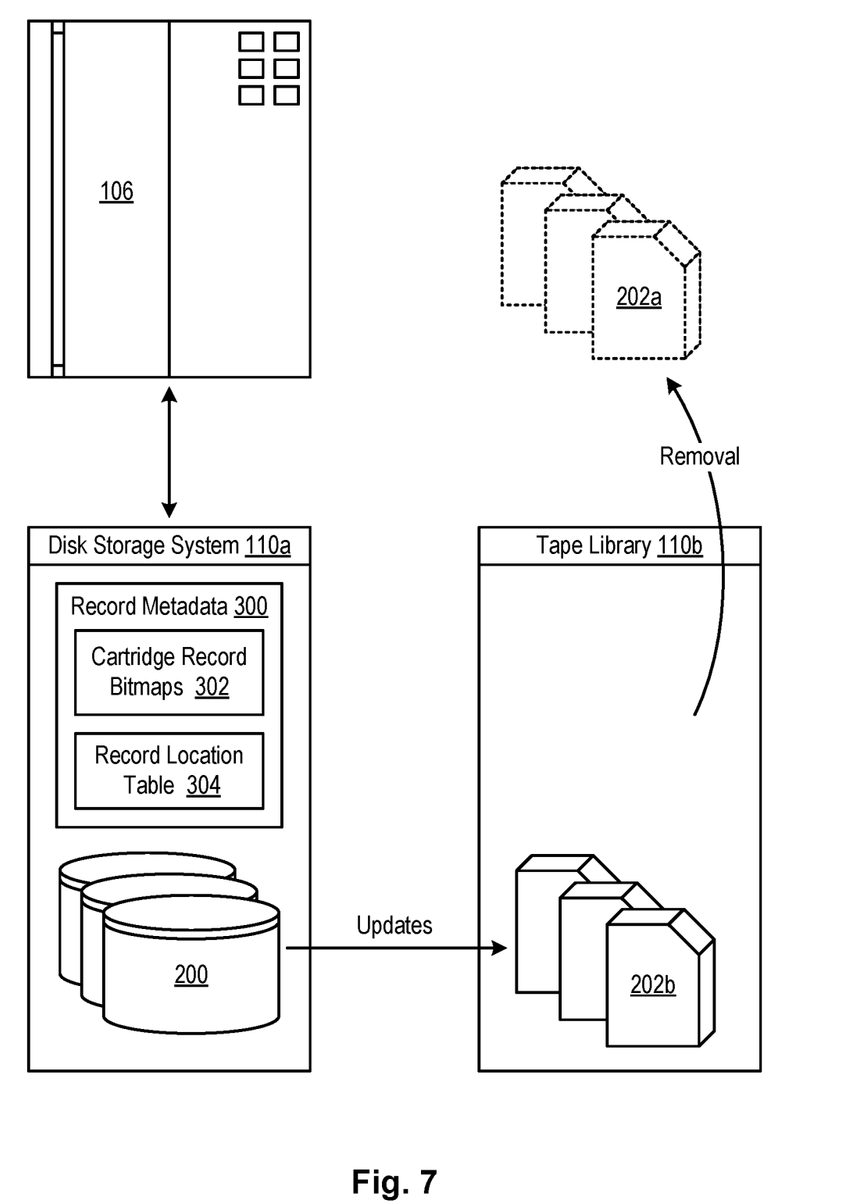
FIG. 7 is a high-level block diagram showing physical removal of the old tape cartridges from the tape library after the data transfer and repartitioning processes are complete.

Referring to FIG. 7, once the data transfer and repartitioning processes are complete, the old tape cartridges 202a may be physically removed from the tape library 110b and moved to an offsite location. In certain embodiments, the repartitioning process may enable only certain old tape cartridges 202a (i.e., those that store critical backup data) to be removed from the tape library 110b, while enabling other old tape cartridges 202a to be reused.

As previously discussed, the systems and methods disclosed herein may be used in asynchronous mirroring environments. In such embodiments, systems and methods in accordance with the invention may enable a user to select consistency groups that are transferred to new tape cartridges 202b, as opposed to transferring all consistency groups. This may accelerate the data transfer process when transferring active data from old tape cartridges 202a to new tape cartridges 202b. In such embodiments, the data transfer process may only transfer active storage elements of the selected consistency groups, as opposed to all active storage elements.

Both the data transfer process and repartitioning process disclosed herein utilize tape drives of the tape library 110b to write to tape cartridges 202. The mirroring or synchronization of updates from the disk storage system 110a to the tape library 110b may be impacted by these processes in that certain tape drives may be unavailable. This may be particularly true of the repartitioning process as it may load old tape cartridges 202a into tape drives that cannot be used to receive updates from the disk storage system 110a. In certain embodiments, systems and methods in accordance with the invention may enable a user to specify which tape drives are used by the data transfer process and/or repartitioning process to ensure that sufficient tape drives and bandwidth are available to handle the mirroring or synchronization of updates from the disk storage system 110a to the tape library 110b.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for swapping out tape cartridges in tape libraries, the method comprising:
    maintaining, in a tape library, old tape cartridges backing up data in a primary storage system;
    adding, to the tape library, new tape cartridges to replace the old tape cartridges;
    initiating a data transfer process to move active data to the new tape cartridges, wherein moving the active data comprises first moving active data in less frequently accessed storage elements, followed by active data in more frequently accessed storage elements; and
    during the data transfer process, backing up updates to data in the primary storage system to the new tape cartridges.

2. The method of claim 1, wherein moving the active data to the new tape cartridges comprises moving the active data from the primary storage system to the new tape cartridges.

3. The method of claim 2, wherein moving the active data to the new tape cartridges comprises initially analyzing a record location table in the primary storage system to determine which data is active.

4. The method of claim 1, in the event a failure occurs on the primary storage system during the data transfer process, recovering data on the primary storage system from both the old tape cartridges and new tape cartridges.

5. The method of claim 1, further comprising, after completing the data transfer process, physically removing the old tape cartridges from the tape library.

6. The method of claim 1, wherein backing up updates comprises one of synchronously and asynchronously mirroring the updates from the primary storage system to the new tape cartridges.

7. The method of claim 6, wherein initiating the data transfer process comprises initiating the data transfer process only for consistency groups indicated by a user.

8. A computer program product for swapping out tape cartridges in tape libraries, the computer program product comprising a computer-readable storage medium having computer-usable program code embodied therein, the computer-usable program code configured to perform the following when executed by at least one processor:
    maintain, in a tape library, old tape cartridges backing up data in a primary storage system;
    add, to the tape library, new tape cartridges to replace the old tape cartridges;
    initiate a data transfer process to move active data to the new tape cartridges, wherein moving the active data comprises first moving active data in less frequently accessed storage elements, followed by active data in more frequently accessed storage elements; and
    during the data transfer process, backing up updates to data in the primary storage system to the new tape cartridges.

9. The computer program product of claim 8, wherein moving the active data to the new tape cartridges comprises moving the active data from the primary storage system to the new tape cartridges.

10. The computer program product of claim 9, wherein moving the active data to the new tape cartridges comprises initially analyzing a record location table in the primary storage system to determine which data is active.

11. The computer program product of claim 8, wherein the computer-usable program code is further configured to, in the event a failure occurs on the primary storage system during the data transfer process, recover data on the primary storage system from both the old tape cartridges and new tape cartridges.

12. The computer program product of claim 8, wherein the computer-usable program code is further configured to, after completing the data transfer process, remove the old tape cartridges from the tape library.

13. The computer program product of claim 8, wherein backing up updates comprises one of synchronously and asynchronously mirroring the updates from the primary storage system to the new tape cartridges.

14. The computer program product of claim 13, wherein initiating the data transfer process comprises initiating the data transfer process only for consistency groups indicated by a user.

15. A system for swapping out tape cartridges in tape libraries, the system comprising:
    at least one processor;
    at least one memory device operably coupled to the at least one processor and storing instructions for execution on the at least one processor, the instructions causing the at least one processor to:
        maintain, in a tape library, old tape cartridges backing up data in a primary storage system;
        add, to the tape library, new tape cartridges to replace the old tape cartridges;
        initiate a data transfer process to move active data to the new tape cartridges, wherein moving the active data comprises first moving active data in less frequently accessed storage elements, followed by active data in more frequently accessed storage elements; and
        during the data transfer process, backing up updates to data in the primary storage system to the new tape cartridges.

16. The system of claim 15, wherein moving the active data to the new tape cartridges comprises moving the active data from the primary storage system to the new tape cartridges.

17. The system of claim 16, wherein moving the active data to the new tape cartridges comprises initially analyzing a record location table in the primary storage system to determine which data is active.

18. The system of claim 15, wherein the instructions further cause the at least one processor to, in the event a failure occurs on the primary storage system during the data transfer process, recover data on the primary storage system from both the old tape cartridges and new tape cartridges.

19. The system of claim 15, wherein the instructions further cause the at least one processor to, after completing the data transfer process, enable removal of the old tape cartridges from the tape library.

20. The system of claim 15, wherein initiating the data transfer process comprises initiating the data transfer process only for consistency groups indicated by a user.

* * * * *